(12) United States Patent
Saw et al.

(10) Patent No.: US 7,694,142 B2
(45) Date of Patent: Apr. 6, 2010

(54) DIGITAL CONTENT DISTRIBUTION SYSTEMS

(75) Inventors: Chit Wei Saw, Cupertino, CA (US); Slawomir K. Ilnicki, Los Altos, CA (US); Christian J. van den Branden Lambrecht, Sunnyvale, CA (US); Joyce E Farrell, Menlo Park, CA (US); Cormac Herley, Los Gatos, CA (US); Joan Maria Mas Ribes, Brussels (BE)

(73) Assignee: Hewlett-Packard Development Company, L.P., Houston, TX (US)

( * ) Notice: Subject to any disclaimer, the term of this patent is extended or adjusted under 35 U.S.C. 154(b) by 1360 days.

(21) Appl. No.: 11/129,982

(22) Filed: May 16, 2005

(65) Prior Publication Data

US 2005/0268090 A1 Dec. 1, 2005

(51) Int. Cl.
*H04L 9/32* (2006.01)
*G06F 21/00* (2006.01)

(52) U.S. Cl. .............. 713/175; 705/51; 726/10
(58) Field of Classification Search ................. 713/175; 705/51, 59, 26–27; 726/2–5, 10
See application file for complete search history.

(56) References Cited

U.S. PATENT DOCUMENTS

| 5,629,980 | A  | * | 5/1997  | Stefik et al. | 705/54  |
| 5,815,574 | A  | * | 9/1998  | Fortinsky     | 713/153 |
| 6,233,684 | B1 | * | 5/2001  | Stefik et al. | 713/176 |
| 6,314,521 | B1 | * | 11/2001 | Debry         | 726/10  |
| 6,385,728 | B1 | * | 5/2002  | DeBry         | 726/9   |
| 6,643,774 | B1 | * | 11/2003 | McGarvey      | 713/155 |

* cited by examiner

*Primary Examiner*—Minh Dieu Nguyen

(57) ABSTRACT

A system for distributing digital content over a computer network (e.g., the Internet) uses certificates to establish a trust relationship between a content provider and a display device. The certificates identify the display device and the content provider as well as unique characteristics of the distribution. For example, the content provider may be a book publisher and the display device may be a printer/binder.

13 Claims, 13 Drawing Sheets

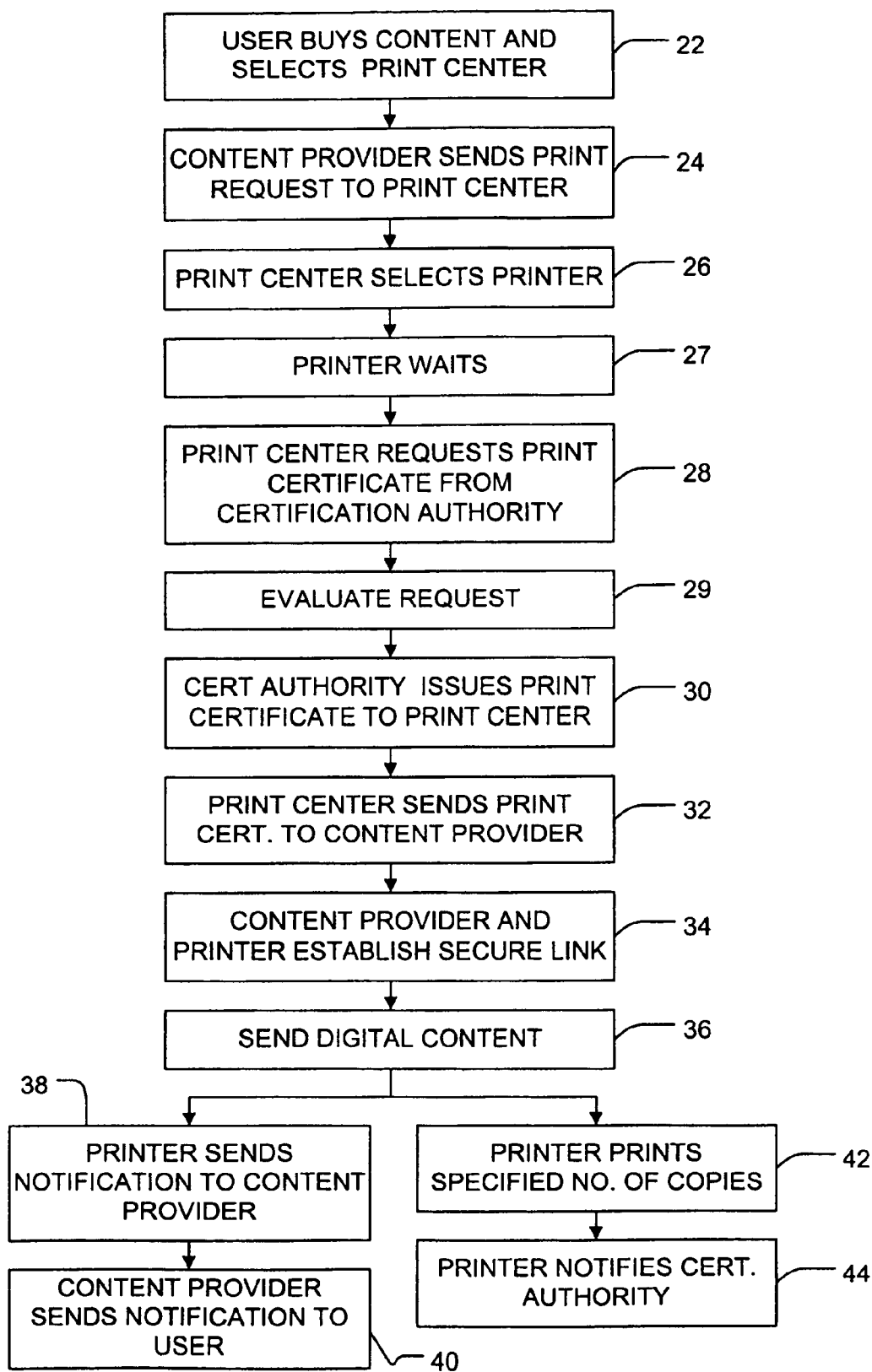

FIG. 4

- 160 PRINT REQUEST
- 162 PRINT PARAMS
  PAPER SIZE/TYPE,
  NO. OF COPIES,
  PRINTER SPECIFIC
  PARAMETERS,
  UNIQUE FILE ID
- 164 SIGNATURE
  (CONTENT PROVIDER)
- 166 PUBLIC KEY
  CERTIFICATE
  (CONTENT PROVIDER)

FIG. 3

- 150 PURCHASE REQUEST
- 152 DIGITAL CONTENT ID.
- 154 CUSTOMER INFO.
  NAME,
  E-MAIL ADDRESS
- 156 PRINT INFO.
  PRINT CENTER,
  PAPER SIZE/TYPE,
  NO. OF COPIES
- 158 PAYMENT INFO.
  CREDIT CARD NO.
  EXP. DATE

Send Certificate — 350
- 350a: JOB SPEC.
- 350b: AUTHORITY TO DELEGATE
- 350c: UD PUBLIC KEY
- 350d: VALIDITY PERIOD
- 350e: SIGNATURE (USER DOMAIN)

User Certificate — 254
- 254a: CONTENT PROVIDER PUBLIC KEY
- 254b: ACCESS RIGHTS
- 254c: AUTHORITY TO ASSIGN
- 254d: VALIDITY PERIOD
- 254e: SIGNATURE (USER DOMAIN)

DIGITAL CONTENT DISTRIBUTION SYSTEMS

BACKGROUND OF THE INVENTION

The present invention relates to distribution of digital content over a computer network. For example, the present invention relates to on-demand book printing.

Rapid improvements in printing and binding technologies are being made. Specialized printers are being developed to print and bind books on demand, within only several minutes. These technologies will lead to on-demand book publishing in which books are not printed in advance. A customer in London will be able to order a book from a nearby bookshop. If the bookshop does not have the book in stock, it will request a publisher in New York to transmit digital content over the Internet. The bookshop will receive the digital content over the Internet, print the digital content, bind the printed pages into a book, and deliver the book to the customer. The on-demand book publishing will have many advantages over the traditional printing and distribution methods. For example, books will not be stored and transported as physical paper-based products. Thus, storage and transportation costs will be eliminated.

There will be a need to protect the digital content during distribution over a non-secure network such as the Internet. An Internet security protocol such as Secure Socket Layer ("SSL") protocol will be inadequate. The SSL protocol allows a secured data communication link to be established between sending and receiving parties. Thus, any two parties having knowledge of each others public keys could establish an SSL secure link and send encrypted data over the link.

During a transaction, the content provider selects a printer or other end point. Once a printer is selected, the SSL protocol can provide a guarantee as to the identity of the printer. However, the SSL protocol cannot provide a guarantee that the printer can be trusted, nor can the SSL protocol help the content provider select a printer that can be trusted.

Additionally, the SSL protocol cannot ensure that certain characteristics of a particular job are fulfilled. It cannot ensure that a printer, for example, would have the resources to print and bind a particular book.

Moreover, once the digital content has left the content provider, the content provider would no longer control its intellectual property rights (also referred to as "digital rights") in the content. The content provider should have a certain degree of control over the printing process and sufficient trust with the entity that receives the content and prints the books. For example, if a single book is ordered and paid for, only one book should be printed, bound, and delivered. The content provider should have control over the printing and binding process to ensure that only one book is produced. A protocol such as SSL would not provide the control.

Another application for which controlled distribution and printing of documents is useful is the delivery of confidential documents. Here too, the content provider should have an acceptable degree of control over the printing process and have a sufficient level of trust with the printer to protect the confidentiality of the documents and to limit distribution of the confidential documents.

Thus, a need exists for a system that can control the printing and distribution of digital content while protecting the digital rights. Such a system should also be able to select a printer or other end point that can be trusted.

SUMMARY OF THE INVENTION

According to one aspect of the present invention, a content provider waits for a certificate via the network; and establishes a secure communication link on the network if the certificate is received. The secure link is established with a display device indicated in the certificate. Digital content is then sent via the secure link to the display device indicated in the certificate.

According to another aspect of the present invention, a receiver of digital content receives a certificate on a network; waits for the content provider indicated in the certificate to initiate the establishment of a secure network communication link; and establishes a secure link on the network if the content provider indicated in the certificate presents the certificate.

According to yet another aspect of the present invention, an authorization authority receives a certificate request on the network. The request specifies at least one of a content provider and a display device. The request also specifies a display characteristic. The authorization authority determines whether all specified participants can satisfy the display characteristic; and sends a certificate via the network if the specified participants can satisfy the display characteristic. The certificate also specifies the display characteristic.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 2 is a flow chart of a communication sequence for the centralized system;

FIG. 3 is a diagram of a purchase request;

FIG. 4 is a diagram of a print request;

DETAILED DESCRIPTION OF THE INVENTION

Figure 1:
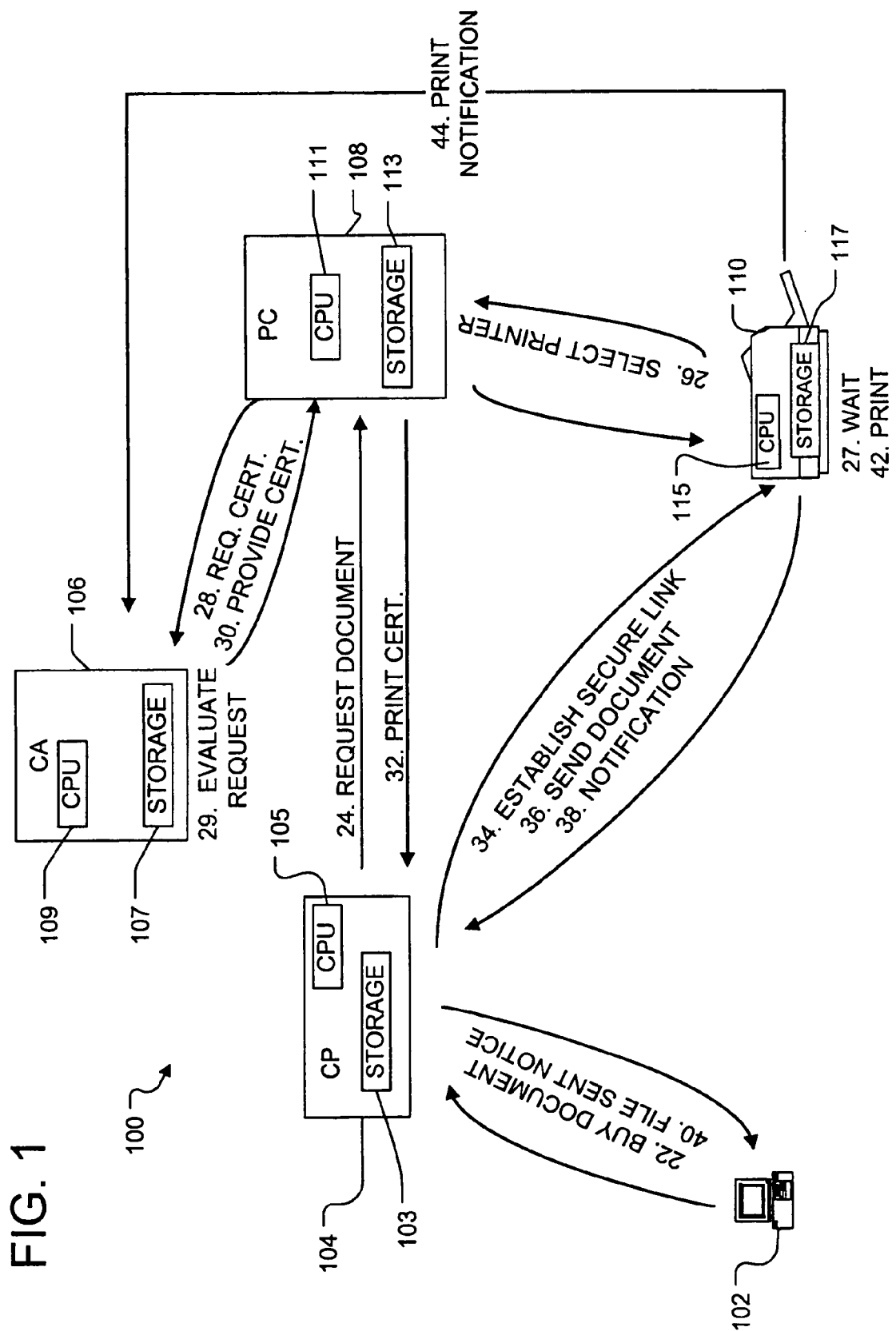
FIG. 1 is a diagram of a centralized digital content distribution system according to the present invention.

As shown in the drawings for purposes of illustration, the present invention is embodied in centralized and decentralized systems for distributing digital content over a network. The systems use certificates to establish a trust relationship between content provider and printer. The systems can also protect the digital rights of the content provider.

Centralized System

FIG. 1 shows a centralized document distribution system 100 including the following participants: a content provider 104 for providing digital content; a printer 110; a print center 108 for managing various display devices including the printer 110; and a certification authority 106 trusted by the content provider 104, the print center 108, and the printer 110. All of the participants 104, 106, 108 and 110 are preferably connected to a network. The network allows each of the participants to communicate with the other participants. The network may be the Internet, a local area network or any other type of network.

Each of these participants 104, 106, 108 and 110 has its own public key/private key pair for secure communication and digital signature. Using these cryptographic keys, each of the participants 104, 106, 108 and 110 is capable of decrypting incoming messages and encrypting and signing outgoing messages.

The content provider 104, the print center 108, and the printer 110 are registered with the certification authority 106. That is, the content provider 104, the print center 108, and the printer 110 have submitted their public keys to the certification authority 106, and the certification authority 106 has issued a unique public key certificate to each of the other participants of the system 100. In the alternative, the certification authority 106 may generate the public key certificates and issue the public key certificate to the other participants of the system 100. The public key certificate may be an X.509 certificate, a Simple Public Key Infrastructure ("SPKI") certificate or any other suitable certificate.

Operation of the system 100 is illustrated in FIGS. 1 and 2. Directed lines 22 to 44 in FIG. 1 correspond to blocks 22 to 44 in FIG. 2. A user 102 purchases a document from the content provider 104 by sending a purchase request to the content provider 104 (block 22). The purchase request may be sent, for example, by sending an electronic mail (e-mail) message to the content provider 104, placing a phone call with the content provider 104, etc.

The purchase request preferably identifies the digital content that the user 102 wishes to purchase, and it may also identify a payment method. For example, the purchase request may identify a book that the user 102 wishes to purchase, and it may contain the user's credit account information. The purchase request may also identify a print center 108 to which the user 102 would like the content delivered. For example, the user 102 may be an individual in Los Angeles who sends the purchase request to the content provider 104, a publisher in New York. In the purchase request, the user 102 may identify a nearby print center 108 in Los Angeles. If the purchase request does not identify a print center, the content provider 104 may designate the print center 108.

Once a purchase request is made, the content provider 104 and the printer 110 establish a trust relationship. After receiving the purchase request, the content provider 104 sends a print request to the print center 108 (block 24). The print request may include a file identifier, which identifies the digital content to be printed. The file identifier may be a hash of the digital content. The print request may also list all desired options such as type of finish, paper size, and the number of copies to print.

The print center 108 may include facilities to house and maintain display devices including, without limitation, specialized printers such as printers that can print and bind books and high-resolution printers that can print reproductions of paintings. The print center 108 houses and manages the printer 110. The print center 108 may implement policies regarding acceptance or rejection of certain print requests.

The print center 108 selects a printer 110 for the requested print job (block 26). The selection may be performed by polling the printer 110, whereby the print center 108 sends a printer status inquiry to the printer 110. The printer status inquiry provides the printer 110 with sufficient information for the printer 110 to determine whether it has the capability and the resources to print the digital content identified by the printer status inquiry. For example, the printer status inquiry might specify special paper, multiple copies, a predetermined amount of ink, a special type of binding, etc. Upon receiving the printer status inquiry and determining whether it can complete the requested print job, the printer 110 sends a printer status reply to the print center 108. The printer status reply may include the printer's own identifier (e.g., a serial number) and a job identifier. The job identifier may be a number that is randomly generated by the printer 110 and assigned to the requested print job.

After the printer 110 has been selected by the print center 108, the printer 110 goes into a wait state (block 27) and awaits a communication from the content provider 104. If the communication is not established within a timeout period, the printer 110 terminates the print job and sends a termination notification to the print center 108.

If the print status reply indicates that the printer 110 can perform the requested print job, the print center 108 may select the printer 110 for the requested print job. If the print status reply indicates that the printer 110 cannot complete the print job, the print center 108 may send print status inquiries to other printers.

After selecting the printer 110 for the job, the print center 108 requests a print certificate from the certification authority 106 by sending a print certificate request to the certification authority 106 (block 28). The print certificate request includes sufficient information to identify all of the participants of the print job. To identify the participants 104, 108 and 110, the print certificate request may include the public keys of the content provider 104, the print center 108, and the printer 110.

The certification authority 106 evaluates the print certificate request (block 29). The certification authority 106 checks its own database 107 of registered participants to verify the validity and authenticity of the participants 104, 108 and 110 identified in the print certificate request. For example, the certification authority 106 checks its database for matching entries that correspond to the public key certificates of the participants. Even if the participants are registered, the certification authority 106 might still refuse to issue a print certificate if the print certificate request is not "acceptable." For example, one of the participants might be temporarily "blacklisted" even though it is still in the database. The certification authority 106 might disallow the print certificate request simply because the print certificate request has violated one of authority's governing rules (e.g., a certain content provider might not be allowed to use a certain printer).

If the certification authority 106 determines that the participants are registered and the print certificate request is acceptable, the certification authority 106 issues a print certificate response to the print center 108 (block 30). The print certificate response includes a print certificate that may include a "validity period" or a "time stamp" plus "life." The life of the print certificate may be set to a period in which the printer 110 has sufficient time to receive the digital content and print the content. Assigning such a short life helps to authenticate the participants and permit binding of various constraints for the print job.

The print certificate may include other job characteristics. For example, the digital content may be identified by the file identifier, the job may be identified by the job identifier, the printer 110 may be identified by the printer serial number, all of which are provided in the print certificate response. Print parameters such as the number of copies and paper type may also be included in the print certificates. If any of these job characteristics do not check out, the printer 110 would refuse to print the job.

Moreover, certain job characteristics will change from print job to print job. Time stamps and validity periods will change from job to job, and job identifiers will change from job to job. This all reduces the chance of a print certificate response being reused. Consequently, digital rights of the content provider 104 are protected.

The print center 108 receives the print certificate response from the certification authority 106 and then forwards the print certificate along with the printer status reply to the content provider 104 (block 32). The trust relationship between the content provider 104 and the printer 110 is thus established because the print certificate indicates that all parties to the specific print job have been certified by the certification authority 106.

Once the trust relationship has been established, the content provider 104 contacts the printer 110 directly by establishing a secure communications link (block 34). The secure communication link may be established by using a secure protocol such as SSL. As an identity verification measure, the public key(s) used in the SSL communication may be compared to the public keys in the print certificate.

All subsequent communications are performed over the secure communication link. The content provider 104 sends a printer initialization request to the printer 110. The printer initialization request may include the printer identifier, the job identifier, the print center's public key, and the print certificate. The initialization request may also include a session symmetric key that can be used to encrypt and decrypt data packets to be sent during the transfer of the digital content. The symmetric key may be encrypted using the printer public key. The symmetric key technique may be an integral part of the secure communications link (e.g., SSL, IPsec)

The printer 110 responds by sending a printer initialization reply to the content provider 104. After receiving an initialization reply from the printer 110, the content provider 104 sends the digital content to the printer 110 (block 36). After receiving the entire the digital content, the printer 110 sends a data receipt acknowledgement to the content provider 104 (block 38). The content provider 104 notifies the user 102 (e.g., via e-mail) that the digital content has been sent to the printer 110 (block 40).

The printer 110 prints only the number of copies specified in the print certificate or display status inquiry (block 42). Thus, the system 100 ensures that only the agreed-upon number of copies is made and thereby protects the digital rights of the content provider 104. Following a successful printing, the printer 110 sends a print notification to the certification authority 106 (block 44).

The printer 110 may also perform other functions. For example, if the printer 110 is a specialized printer-binder, the printer 110 may also bind the printed pages to form a book.

The content provider 104 may be a computer that has data storage 103, a processor 105, and a network interface (not shown). The storage 103 contains the content provider's public and private keys and the content provider's public key certificate, once obtained from the certification authority 106. Also included in the storage 103 are instructions for the processor 105 to perform the content provider operations detailed above.

The print center 108 includes a computer that has a processor 111, data storage 113 and a network interface (not shown). The storage 113 contains the print center's public and private keys and the print center's public key certificate, once obtained from the certification authority 106. Also included in the storage 113 are instructions for the processor 111 to perform the print center operations detailed above.

The printer 110 includes a processor 115, data storage 117 and a network interface (not shown). The storage 117 contains the printer identifier, the printer's public and private keys and the printer's public key certificate. The printer identifier may be the serial number of the printer 110. The printer's public key certificate may issued by a trusted authority (not necessarily a certification authority) and it may be embedded within the printer 110 at the factory or programmed into the printer 110 at a later time. Also included in the storage 117 are instructions for the processor 115 to perform the printer operations detailed above.

The certification authority 106 includes a computer having data storage 107, a processor 109 and a network interface (not shown). The storage 107 contains the certification authority's public and private keys and the certification authority's certificate. Also stored in the storage 107 is a database pertaining to all of the registered participants of the system 100. Further, the storage 107 includes instructions for the processor 109 to perform the certification authority operations detailed above. All of these parties may use a tamper-proof storage for storing and operating on the private keys.

The certification authority storage 107 may include other instructions. For example, the certification authority storage 107 may include, without limitation, instructions to register new participants into its database. The certification authority 106 may handle billing for the content provider 104. The user or customer may have an account with the certification authority 106. When the certification authority 106 receives the notification from the printer 110, it can charge the customer's account. The certification authority can also save copies of the print certificate responses for record keeping purposes.

Sample Message Formats

FIG. 3 illustrates a sample purchase request 150 sent by the user 102 to the content provider 104. The purchase request 150 includes an identification 152 of the digital content being purchased; a customer information portion 154 indicating information about the purchaser (e.g., name and email address); a print information portion 156 including identification of the print center to which the digital content will be sent, a listing of desired options such as paper size and shape, and number of copies to be printed; and a payment information portion 158 (e.g., a portion containing credit card information). The request may be signed for non-repudiation purposes (e.g., proof of purchase).

FIG. 4 illustrates a sample print request 160 sent by the content provider 104 to the print center 108. The print request 160 includes a print parameter portion 162, which contains information from the print information portion 156 of FIG. 3. The print parameter portion 162 may also include printer specific parameters and a file identifier. The print request 160 further includes a signature portion 164 (e.g., a digest that is encrypted with the content provider's private key) and a public key certificate 166 including the content provider's public key.

Figure 5:
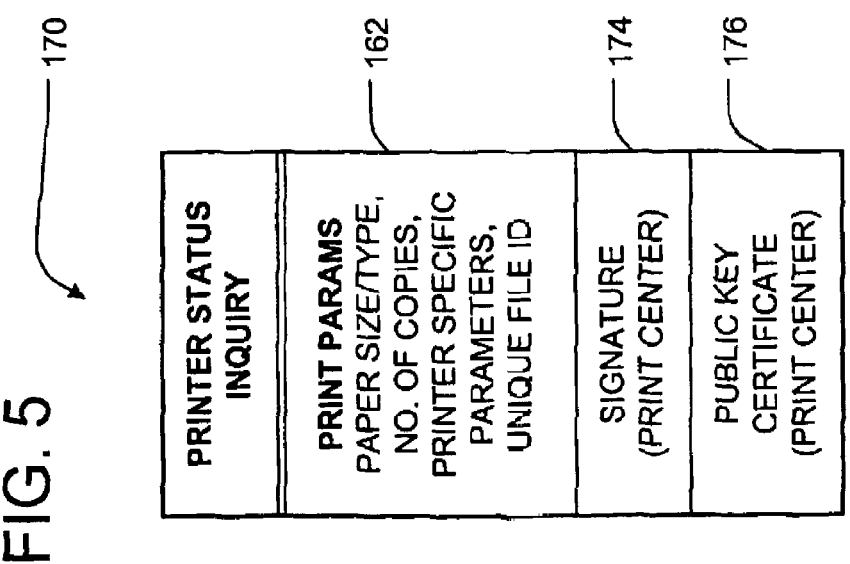
FIG. 5 is a diagram of a printer status inquiry.

FIG. 5 illustrates a sample printer status inquiry 170 sent by the print center 108 to the printer 110. The printer status inquiry 170 is a concatenation of the print parameter portion 162, a signature portion 174 (e.g., a digest that is encrypted with the print center's private key) and a public key certificate 176 including the print center's public key.

Figure 6:
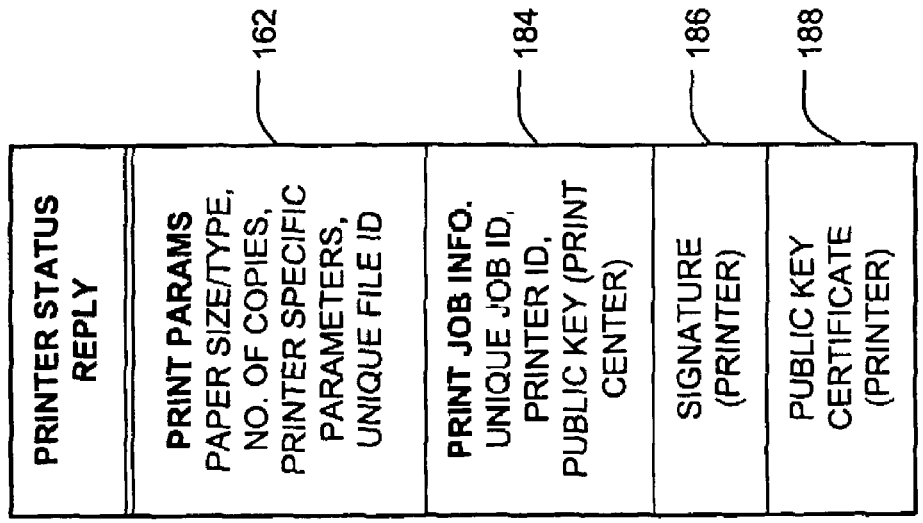
FIG. 6 is a diagram of a printer status reply.

FIG. 6 illustrates a sample printer status reply 180 sent by the printer 110 to the print center 108. The printer status reply 180 is a concatenation of the print parameter portion 162, a print job portion 184, a signature portion 176 (e.g., a digest that is encrypted with the printer's private key) and a public key certificate 188 including the printer's public key. The print job portion 184 includes a job identifier, a printer identifier and the public key of the print center 108.

Figures 7, 8:
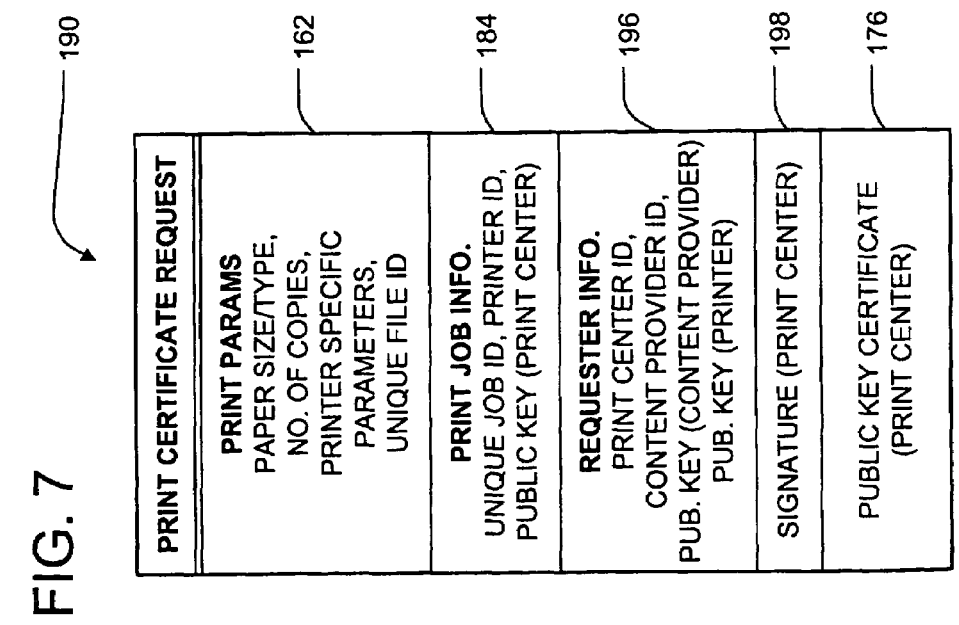
FIG. 7 is a diagram of a print certificate request.
FIG. 8 is a diagram of a print certificate response.

FIG. 7 illustrates a sample print certificate request 190 sent by the print center 108 to the certification authority 106. The print certificate request 190 is a concatenation of the print parameter portion 162, the print job portion 184, a requester information portion 196, a signature portion 198 (e.g., another digest that is encrypted with the print center's private key) and the public key certificate 176 including the print center's public key. The requester information portion 196 contains a print center identification, a content provider identification, a public key of the content provider and the public key of the printer 110.

FIG. 8 illustrates a sample print certificate response 200 sent by the certification authority 106 to the print center 108. The print certificate response 200 is a concatenation of the print parameter portion 162, the print job portion 184, the requester information portion 196, a signature portion 208 (e.g., a digest that is encrypted with the certification authority's public key) and a print certificate 209. The print certificate 209 includes the public key of the content provider, the public key of the printer 110, the printer identifier, the unique file identifier and a validity period (that is, a certificate life). The print certificate 209 may also include the job identifier and print parameters such as the number of copies and paper type. Adding job-specific information to the print certificate will further increase the binding.

Figure 9:
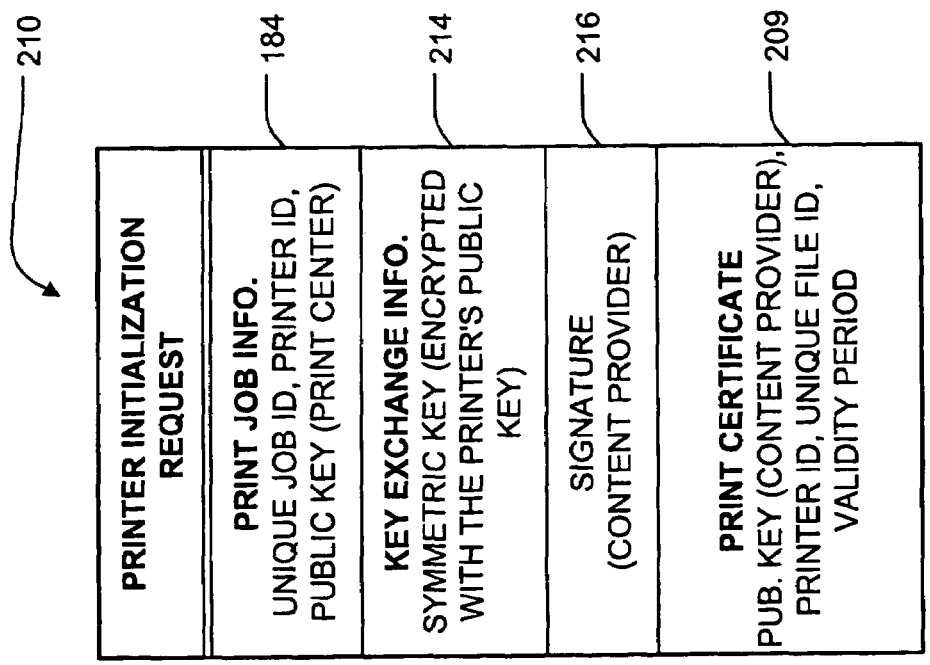
FIG. 9 is a diagram of a printer initialization request.

FIG. 9 illustrates a sample printer initialization request 210 sent by the content provider 104 to the printer 110. The printer initialization request 210 includes the print job information portion 184, a key exchange information portion 214, a signature portion 216 (e.g., a digest that is encrypted with the content provider's private key), and the print certificate 209. The key exchange information portion 214 is used to establish a session encryption/decryption symmetric key between the content provider 104 and the printer 110. The exchange information portion 214 may contain a session symmetric key, encrypted with the printer's public key, for encrypting the digital content.

Figure 10:
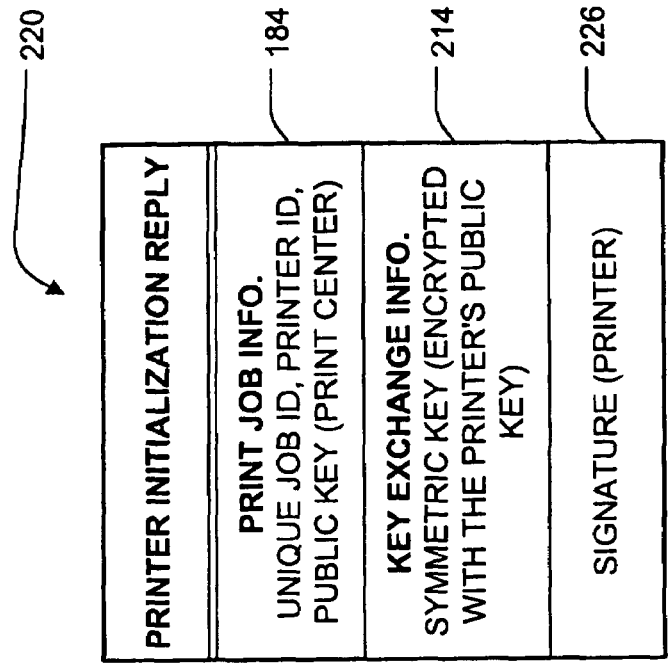
FIG. 10 is a diagram of a printer initialization reply.

FIG. 10 illustrates a sample printer initialization reply 220 sent by the printer 110 to the content provider 104. The printer initialization reply 220 includes the print job information portion 184, the key exchange information portion 214, and a signature 226 (e.g., a digest that is encrypted with the printer's private key).

Figure 11:
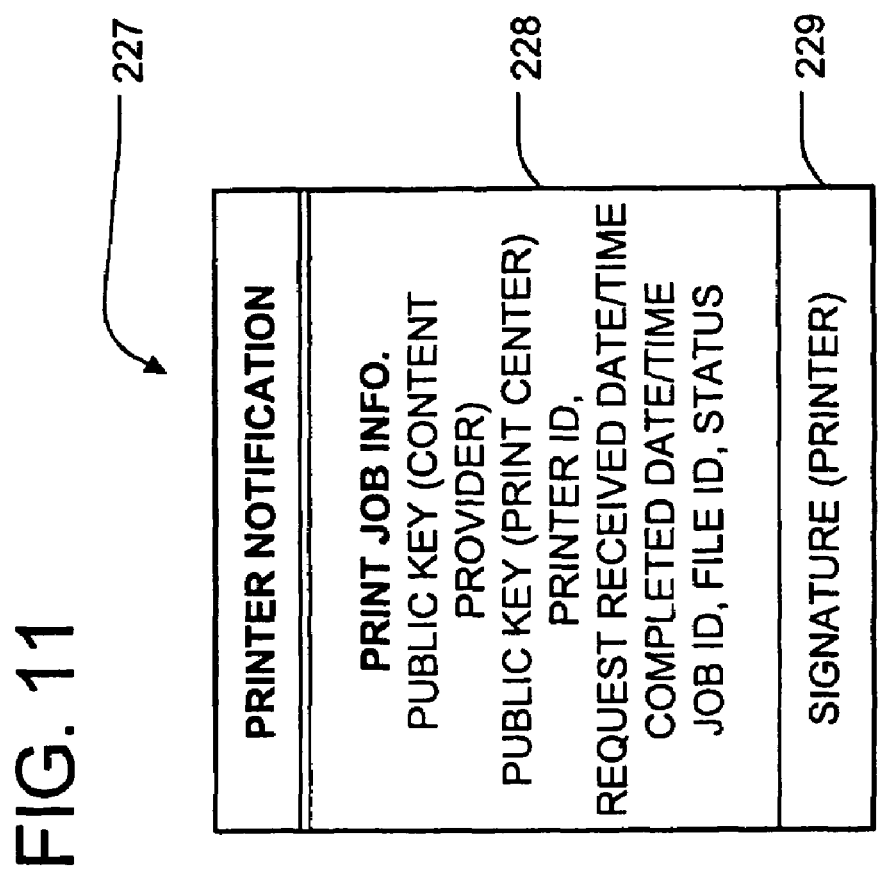
FIG. 11 is a diagram of a print notification.

FIG. 11 illustrates a sample printer notification 227 sent by the printer 110 to the certification authority 106. The printer notification 227 includes a print job information portion 228, which may contain all of the information for the certification authority 106 to update its database as to the status of the print job. For example, the print job information portion 228 may contain public keys of the content provider 104 and the print center 108, the printer identifier, the job identifier, the file identifier, and date/time stamps of various stages during transfer of the digital content. The printer notification 227 may also a signature 229 (e.g., a digest that is encrypted with the printer's private key).

Decentralized System

Figure 12:
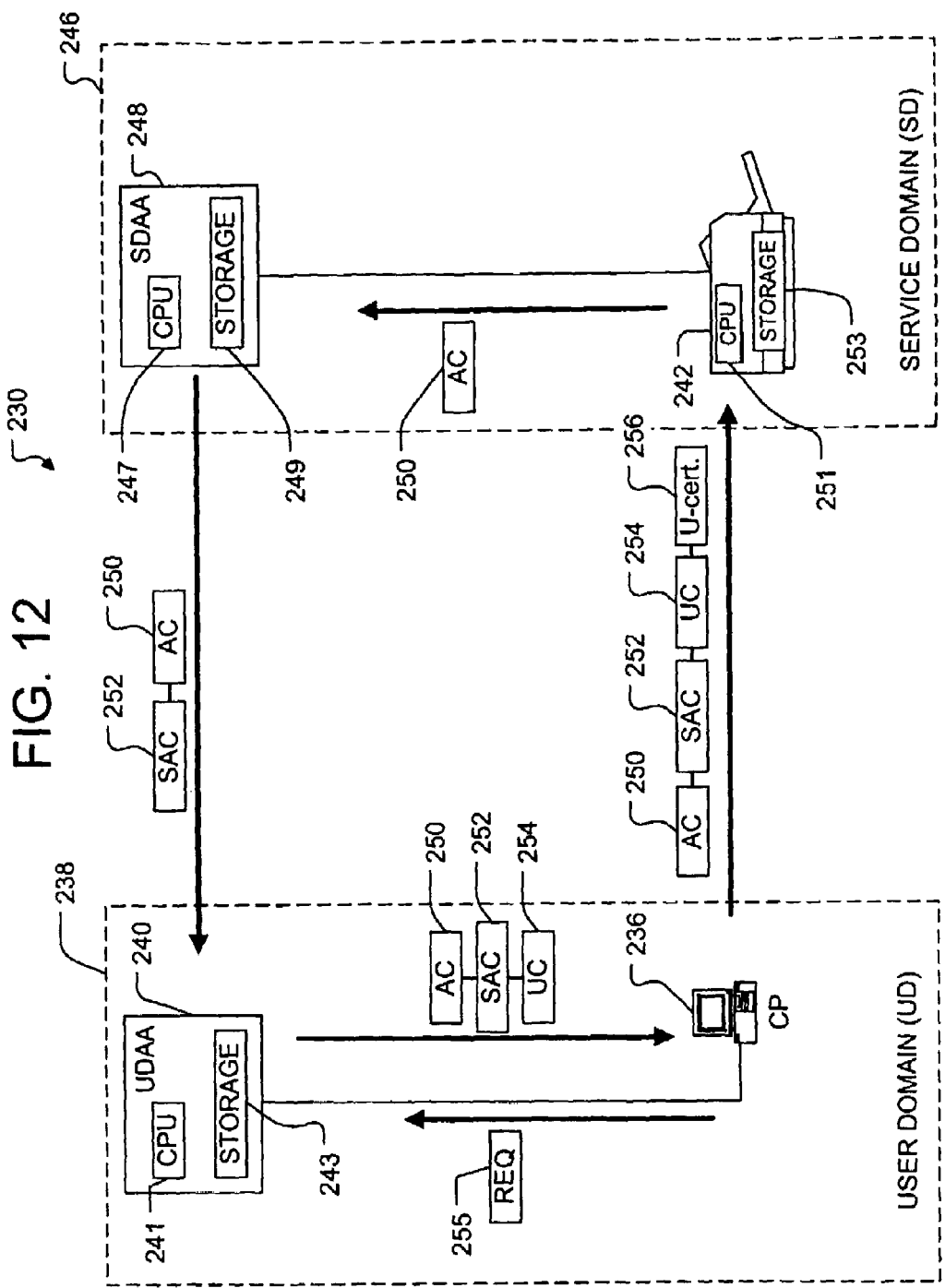
FIG. 12 is a diagram of a decentralized digital content distribution system according to the present invention, the diagram also illustrating a first communication sequence for the decentralized system.
Figure 14:
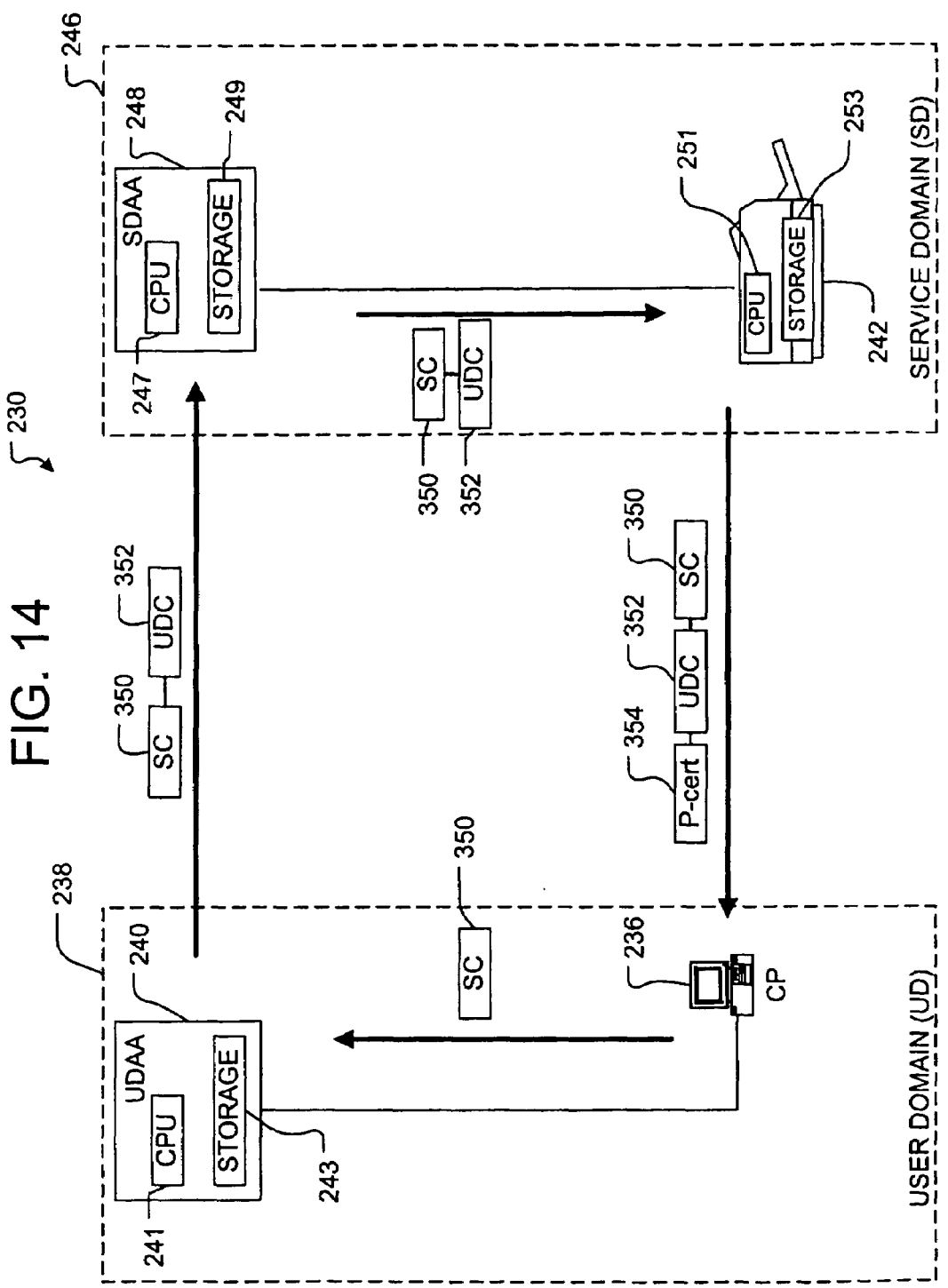
FIG. 14 is a diagram of the decentralized digital content distribution system and a second communication sequence for the decentralized system.

FIGS. 12 and 14 illustrate a decentralized digital content distribution system 230. The decentralized digital content distribution system 230 includes a content provider 236 and a printer 242. The content provider 236 is a member of a user domain (UD) 238 and the printer 242 is a member of a service domain (SD) 246. The system 230 further includes a user domain authorization authority (UDAA) 240 for managing access from and to the members of the user domain 238; and a service domain authorization authority (SDAA) 248 for managing access from and to the members of the service domain 246. All of these participants of the document distribution system 230 are connected to a computer network. Each of these participants of the document distribution system 230 has its own public key/private key pair for secure communication and digital signature. Further, each of the participants may have a public key certificate issued from a certification authority (not shown). Unlike the centralized system 100, the decentralized system 230 does not issue certificates on a per-job basis (although it could).

Figure 13:
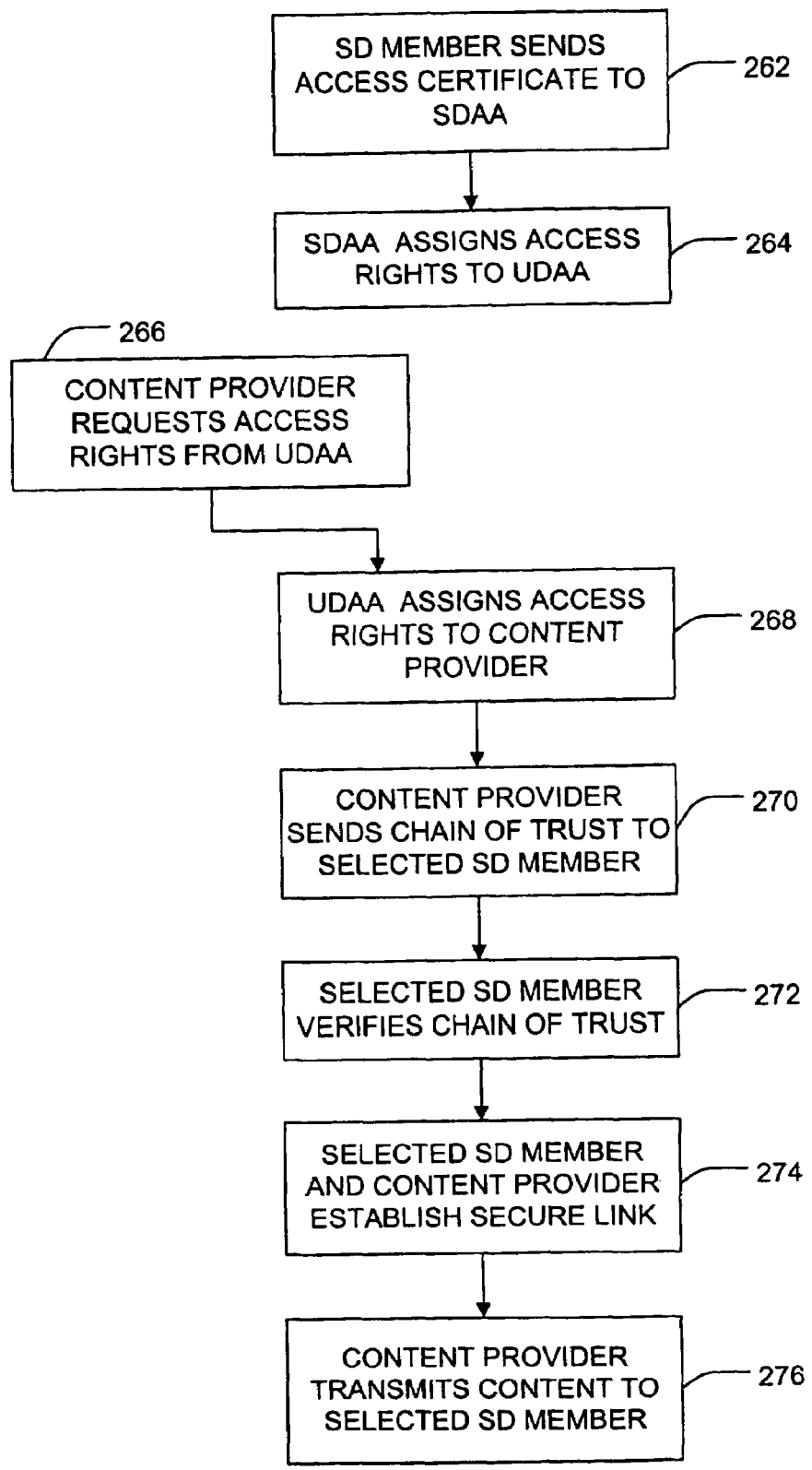
FIG. 13 is a flow chart of the communication sequence illustrated in FIG. 12.

FIGS. 12 and 13 illustrate a first communication sequence for distributing digital content from the content provider 236 to a service domain member. The first communication sequence protects access to the service domain members but does not protect the digital rights of the content provider 236.

Figure 16:
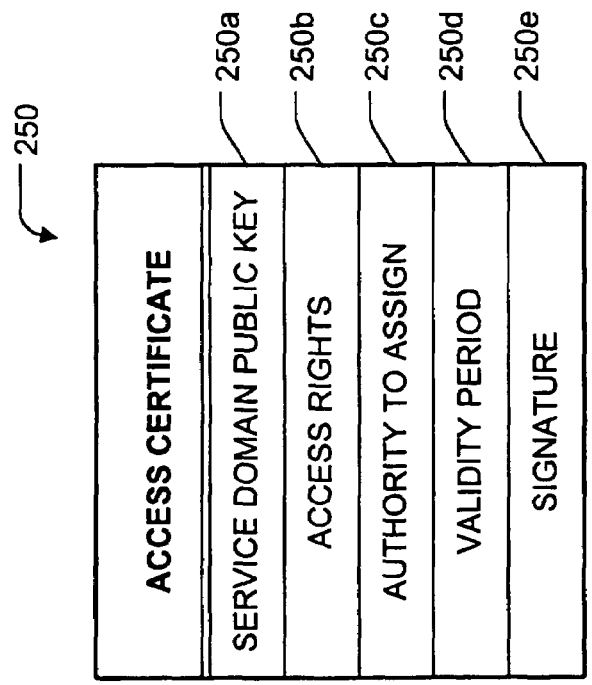
FIG. 16 is an illustration of an access certificate.

During the first sequence, one or more service domain members register with the SDAA 248. Each service domain member may register with the SDAA 248 by sending an access certificate 250 to the SDAA 248. The access certificate 250 grants the SDAA 248 the right to allow other parties to print on the printer 242. For example, the printer 242 registers with the SDAA 248 by sending an access certificate 250 to the SDAA 248 (block 262). The access certificate 250 may include a public key 250$a$ of the service domain, a portion 250$b$ defining the access rights to the printer 242 (e.g., a portion 250$b$ indicating the available printing capability of the printer 242), a portion 250$c$ indicating whether the SDAA 248 may assign the access rights, a portion 250$d$ indicating a validity period 250$d$, and a digital signature portion 250$e$ (see FIG. 16).

Figure 17:
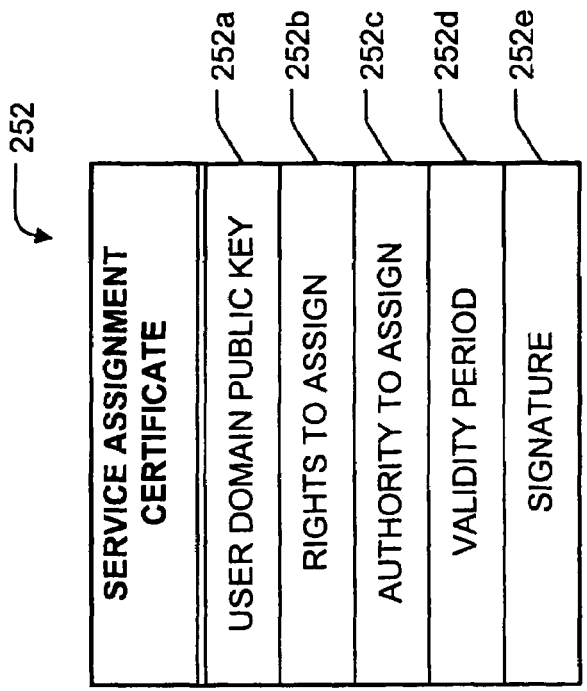
FIG. 17 is an illustration of a service assignment certificate.

When the SDAA 248 receives an access certificate 250 from a service domain member, it can assign access rights to the user domain 238. The SDAA 248 may assign access rights to the user domain 238 by sending the access certificate 250 and a service assignment certificate 252 to the UDAA 240 (block 264). The service assignment certificate 252 may include a public key 252$a$ of the user domain 238, a portion 252$b$ assigning all or a portion of the access rights, an "authority to assign" portion 252$c$ indicating whether the receiver of the service assignment certificate 252 has authority to further assign the access rights, a portion 252$d$ specifying a validity period, and a digital signature portion 252$e$ (see FIG. 17).

For example, the SDAA 248 may assign the access rights of the printer 242 by sending the printer access certificate 250 and a service assignment certificate 252 to the UDAA 240.

The UDAA 248 will usually receive pairs of these certificates 250 and 252 from more than one member of the service domain 246.

When a member of the user domain 238 wishes to send digital content to a member of the service domain 246, that user domain member sends a request 255 to the UDAA 240 (block 266). For example, the content provider 236 sends a request 255 to the UDAA 240 when it wishes to distribute digital content to a service domain member. The UDAA 240 may respond to the request by sending a list of service domain members whose rights have already been assigned to the UDAA 240. The content provider 236 would select a service domain member from the list and indicate the selected SD member to the UDAA 240. Instead, the content provider 236 may specify a service domain member in the request 255, or the UDAA 240 may simply select a service domain member on behalf of the content provider 236.

Figure 18:
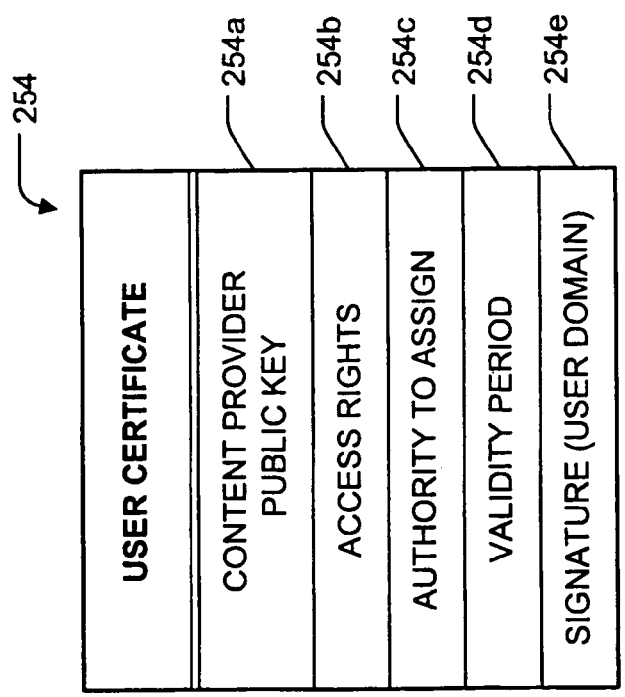
FIG. 18 is an illustration of a user certificate.

When a service domain member is selected (the printer 242, for example), the UDAA 240 assigns access rights to the content provider 236 by sending the access certificate 250, the service assignment certificate 252 and a user certificate 254 to the content provider 236 (block 268). The user certificate 254 assigns to the content provider 236 the right to print the digital content on the selected service domain member. The user certificate 254 may include a public key 254a of the content provider 236, a portion 254b defining the rights assigned, a portion 254c indicating whether the receiver of the user certificate 254 may further assign the rights, a portion 254d specifying a validity period, and a digital signature portion 254e (see FIG. 18). These three certificates—the user certificate 254, the service assignment certificate 252, and the access certificate 250—extend a "chain of trust" from the printer 242 to the content provider 236.

The content provider 236 contacts the selected service domain member directly by sending the chain of trust (that is, the user certificate 254, the service assignment certificate 252 and the access certificate 250) along with its own public key certificate 256 to the selected service domain member (e.g., the printer 242) (block 270).

The selected service domain member receives, examines and verifies the validity of these four certificates 250, 252, 254 and 256 (block 272). Preferably, the selected service domain member traces the certificates of the chain of trust.

After the chain of trust has been verified, a secure link is established between the content provider 236 and the selected service domain member (block 274). The public keys in the certificates may be used to establish the secure link. The printer 242 may also exchange a session key with the content provider, receive digital content via the secure link, and use the session key to decrypt the transmitted content (block 276).

For example, the printer 242 assigns the right to print an unlimited number of pages on it. The right is assigned to the SDAA 248. The SDAA 248 can assign this right to others. This first assignment is represented by the following notation:

[P—R(print unlimited number of pages on P, can delegate) ⓢSDAA]

where P is the printer 242 and SDAA is the SDAA 248. This first delegation is indicated in the access certificate 250.

The SDAA 248, in turn, assigns the right to print 100 pages on the printer 242. This right is assigned to the UDAA 240, which can assign the right to others. This second assignment is represented by the following notation:

[SDAA—R(print 100 pages on P, can delegate) ⓢUDAA]

This second assignment is indicated in the service access delegation certificate 252.

In response to a request 255 from the content provider 236, the UDAA 240 assigns the right to print 50 pages on the printer 242. This right is assigned to the content provider 236. This right cannot be assigned to others. This third assignment is represented by the following notation:

[UDAA—R(print 100 pages on P, cannot delegate) ⓢCP]

where CP is the content provider 236. This third assignment is indicated in the user access delegation certificate 254.

Thus, the content provider 236 receives three certificates: the access certificate 250, the service assignment certificate 252 and the user certificate 254. It also sends these three certificates 250, 252 and 254 as well as its own identification certificate 256 back to the printer 242. The printer 242 verifies this chain of trust.

The printer 242 verifies: (1) that the rights claimed in the user certificate 254 can be honored (i.e., that the content provider 236 can be trusted); and (2) that the entity sending the chain of trust is really the content provider 236 indicated in the user certificate 254.

The first item may be verified as follows. The printer 242 examines the user certificate 254, which indicates that the UDAA 240 has assigned to the content provider 236 the right to print the specified number of pages. The printer 242 may confirm that the entity generating the user certificate 254 (UD ⓢCP) is the same entity specified in the service assignment certificate 252 (SDⓢUD) by verifying that the signer of the user certificate 254 has the same public key as the UDAA 240 identified in the service assignment certificate 252. Similarly, the printer 242 uses the SDAA's public key to verify the signature in the service assignment certificate 252 (SD ⓢUD). The printer 242 may also verify that it did indeed issue the access certificate 250 (PⓢSD).

Having verified the first item, the printer 242 then verifies that the entity sending the chain of trust is really the content provider 236. Such verification may be performed by a common challenge-response exchange whereby the printer 242 generates a random number, encrypts the random number with the content provider's public key, and sends the encrypted number back to the content provider 236. Only the content provider 236 would be able to decrypt the number (since only the content provider 236 should have the corresponding private key). Verification of this second item could be performed as part of the negotiation for establishing the secure link. The randomly generated number could be used as the symmetric key for the secure link.

The steps represented by blocks 262 and 264 may be performed in batch mode. That is, these steps may be performed well in advance of the digital content transfer, without having to wait for the content provider 236 to request access to the printer 242. The steps represented by blocks 266 to 276 may be performed in real time.

Thus, this first communication sequence protects access to the service domain members. However, the user domain member has no assurances that its digital rights will be honored.

Figure 15:
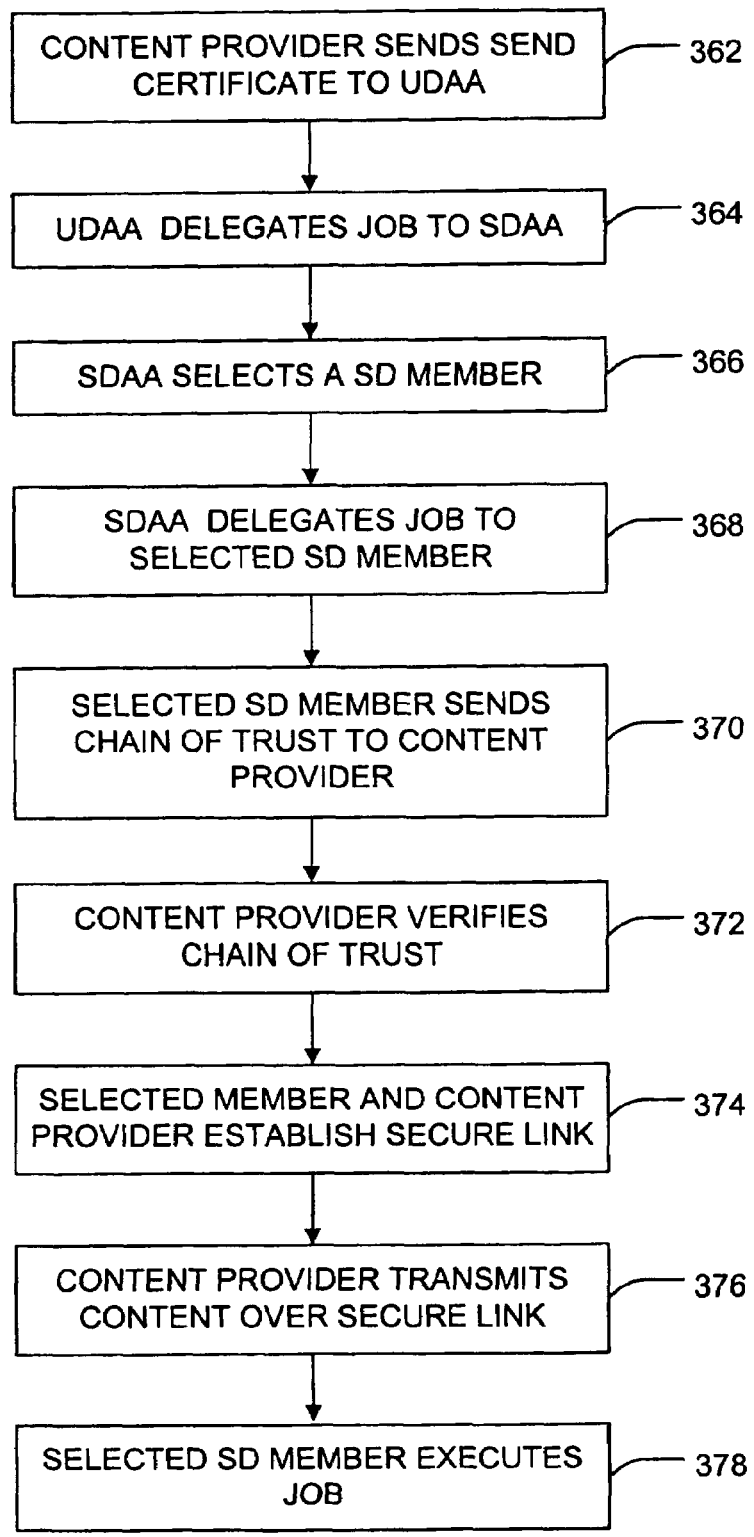
FIG. 15 is a flow chart of the communication sequence illustrated in FIG. 14.

FIGS. 14 and 15 illustrate a second communication sequence for distributing digital content from the content provider 236 to the printer 242. This second communication sequence protects the digital rights of the user domain members but does not protect access to the service domain members.

Figure 19:
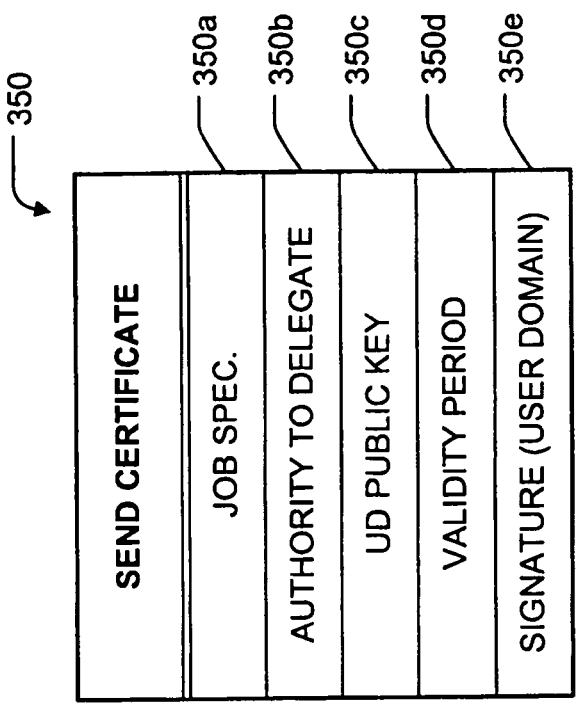
FIG. 19 is an illustration of a send certificate.

When a user domain member wishes to distribute its digital content, it initiates the second communication sequence. For example, the content provider 236 may initiate the second communication sequence by sending a send certificate 350 to the UDAA 240 (block 362). A sample send certificate 350 is shown in FIG. 19. The send certificate 350 may include a portion 350a specifying a job to be performed. The job might be the printing of a 50 page book. This portion 350a may place limitations as to how the job is performed (e.g., the number of copies to be printed, type of paper on which the digital content should be printed). The sample send certificate 350 may also include a portion 350b indicating whether the job can be delegated to other parties, a user domain public key 350c, a portion 350d specifying a validity period, and a digital signature 350e. For example, the delegation [CP—R(print 50 pages and bind, one copy; can delegate)->UDAA] would request the UDAA 240 to find a printer that can print 50 pages and bind the pages into a book. Only one copy of the book would be made.

The UDAA 240 may delegate the user domain member's job to the SDAA 248 by sending a user delegation certificate 352 and the send certificate 350 to the SDAA 248 (block 364). For example, the delegation [UDAA—R(print 75 pages and bind, can delegate)->SDAA] would allow the SDAA 248 to delegate the right to print 75 pages and bind the pages into a book. This delegation is contained in the user delegation certificate 352.

Based on the job requirements and restrictions specified in the send and user delegation certificates 350 and 352, the SDAA 248 selects a service domain member (block 366). The SDAA 248 may store a database of service domain members and, from that database, determine a service domain member that can perform the job, as well as honor the content provider's digital rights. In the alternative, the SDAA 248 can query service domain members until a service domain member is found.

The SDAA 248 delegates the job to the selected service domain member (block 368). The SDAA 248 may delegate the job by sending the user delegation certificate 352 and the send certificate 350 to the selected service domain member (e.g., the printer 242). Together, these certificates 352 and 350 form a chain of trust.

The selected service domain member sends the chain of trust along with its own public key certificate 356 to the content provider 236 (block 370). The content provider 236 receives, examines and verifies the validity of these certificates 350, 352 and 354 (block 372). The content provider 236 can examine and verify the validity of the certificates 350, 352 and 354 in the same manner that the chain of trust was verified in the first communication sequence.

If the certificates in the chain of trust are valid, the content provider 236 establishes a secure link with the selected service domain member (block 374). Following the establishment of the secure link, the content provider 236 transmits the digital content to the selected service domain member (block 376).

The selected service domain member executes the job as specified in the send and user delegation certificates 350 and 352 (block 378). A selected SD member such as the printer 242 would print digital content in accordance with all constraints specified in the user delegation certificate 254.

If the content provider 236 requests a specific member of the service domain (e.g., the printer 242) to execute a job, the UDAA 240 would delegate the job to the SDAA 248, and the SDAA 248 would determine whether that specific printer was available. Once that specific printer became available, the SDAA 248 would send the certificates 350 and 352 to the specific printer.

The decentralized system 230 may perform a third communication sequence, which protects the digital rights of the content provider 236 and protects the access to the service domain members. The content provider 236 sends a send certificate to the UDAA 240. Independently, the service domain members send access certificates to the SDAA 248. The UDAA 240 and the SDAA 248 communicate to match the content provider 236 with a service domain member that can execute the content provider's job and honor the content provider's digital rights. The printer 242, for example, receives the send certificate 350 and a user delegation certificate 352 and forwards those two certificates 350 and 352 to the content provider 236. The content provider 236, in the meantime, receives the access certificate 250, a service assignment certificate 252 and a user certificate 254 and forwards those three certificates 250, 252 and 254 to the printer 242. Both the content provider 236 and printer 242 verify their chains of trust. If both chains of trust are valid, the content provider 236 and printer 242 establish a secure link, the content provider 236 sends digital content to the printer 242, and the printer 242 prints out the digital content.

The content provider 236 may be a computer that is programmed to carry out the content provider functions just described. The printer 242 includes a processor 251 and storage 253 encoded with data for instructing the processor 251 to carry out the printer functions described above.

The SDAA 248 may be a computer including a processor 247 and storage 249 encoded with data for instructing the processor 247 to carry out the SDAA functions described above. The UDAA 240 may be a computer including a processor 241 and storage 243 encoded with data for instructing the processor 247 to carry out the UDAA functions described above.

Although the user domain 238 and the service domain 246 are illustrated as two distinctly separate domains each administered by its own domain authorization authority, they are not so limited. A single domain may serve as a service domain for some of its members and a user domain for other members. A single domain authorization authority may be configured to operate as both a service domain authorization authority and a user domain authorization authority.

There may be more than one SDAA and more than one UDAA. Each authority would issue a certificate.

Although the document distribution systems have been described in connection with a printer, they are not so limited. A system may include other printers and other display devices, such as plotters, fax machines, fax servers, and computers having any one of a CD recorder, a DVD player and a video monitor.

The document distribution systems are not limited to the purchase of books. The systems could be used to distribute art, software, music, videos, confidential documents and other types of digital content.

The content distribution may be initiated in ways other than a user sending a purchase request to a content provider. For instance, the content provider could generate the purchase request (i.e., the request would be self-initiated). If the content provider is a computer having a keyboard, a person could enter the purchase request into the computer via the keyboard.

Once the trust relationship has been established between the content provider and the display device, the secure channel may be established in any number of ways. ECC algorithms, public key algorithms, symmetric key algorithms or other algorithms may be used.

The systems are not limited to wide area networks in general and the Internet in particular. Any network may be used. However, use of the Internet is advantageous because the Internet provides an established infrastructure that is widely used and readily accessible.

Although specific embodiments of the inventions have been described and illustrated, the invention is not limited to the specific embodiments so described and illustrated. Instead, the invention is construed according to the claims that follow.

What is claimed is:

1. A method of authorizing a display job on a display device in a first domain via a network, the method comprising:
   receiving, by an authorization member of a second domain, a chain of trust from an authorization member of the first domain, wherein the chain of trust comprises,
      an access certificate sent from a display device of the first domain to allow the authorization member of the first domain to grant at least one other member rights to access and perform a display job on the display device, and
      an assignment certificate generated by the authorization member of the first domain for assigning at least a portion of the member access rights to the second domain;
   extending, by the authorization member of the second domain, the chain of trust by adding a user certificate to the received chain of trust, the added user certificate indicating an assignment or delegation of the member access rights to the display device of the first domain; and
   sending, by the authorization member of the second domain, the extended chain of trust to a first member in the second domain.

2. The method of claim 1, wherein the first member of the second domain includes a content provider.

3. The method of claim 2, wherein the first member of the second domain is selected in response to a display request from the first member of the second domain; and wherein the added user certificate grants access rights to the display device of the first domain, such that the first domain display device has the right to access the first member of the first domain.

4. The method of claim 1, wherein the display device of the first domain is a printer.

5. A network-based digital content distribution method, the method comprising:
   accessing, by an authorization member of a second domain, a first certificate sent from a printing device of a first domain, wherein the first certificate allows the authorization member of the first domain to grant at least one other member rights to access and distribute content to the printing device;
   generating a second certificate that assigns or delegates at least a portion of the member access rights of the printing device to the second domain;
   creating, by the authorization member of the second domain, a chain of trust that includes the second certificate and the first certificate for a selected member of a second domain; and
   sending, by the authorization member of the second domain, the chain of trust via the network to the selected member of the second domain.

6. The method of claim 5, wherein the selected member of the second domain includes a content provider.

7. The method of claim 6, wherein the authorization member of the a domain manages access from and to members of the first domain.

8. The method of claim 5, wherein the first domain includes display devices.

9. The method of claim 5, wherein the first certificate is accessed from a request from a registered content provider of the second domain to display content on the display device in the first domain, and wherein the second certificate identifies the second domain and includes a portion delegating all or a portion of the access rights.

10. The method of claim 5, wherein the first certificate has a time stamp.

11. The method of claim 5, wherein the second certificate includes a portion indicating whether the access rights can be further assigned or delegated within the second domain.

12. A storage device encoded with computer data that when executed by a computer system performs a method comprising:
   receiving a chain of trust from an authorization member of the first domain, wherein the chain of trust comprises,
      an access certificate sent from a display device of the first domain to allow the authorization member of the first domain to grant at least one other member rights to access and perform a display job on the display device, and
      an assignment certificate generated by the authorization member of the first domain for assigning at least a portion of the access rights to a second domain;
   extending the chain of trust by adding a user certificate to the received chain of trust, the added user certificate indicating an assignment or delegation of the access rights to the display device of the first domain; and
   sending the extended chain of trust to a first member in the second domain.

13. A storage device encoded with computer data that when executed by a computer system performs a method comprising:
   accessing a first certificate sent from a printing device of a first domain, wherein the first certificate allows the authorization member of the first domain to grant at least one other member rights to access and distribute a content to the printing device;
   generating a second certificate that assigns or delegates at least a portion of the access rights of the printing device to a second domain;
   creating a chain of trust that includes the second certificate and the first certificate for a selected member of a second domain; and
   sending the chain of trust via the network to the selected member of the second domain.

\* \* \* \* \*

UNITED STATES PATENT AND TRADEMARK OFFICE
CERTIFICATE OF CORRECTION

PATENT NO. : 7,694,142 B2　　　　　　　　　　　　　　　　　　　　　　　　　Page 1 of 1
APPLICATION NO. : 11/129982
DATED : April 6, 2010
INVENTOR(S) : Chit Wei Saw et al.

It is certified that error appears in the above-identified patent and that said Letters Patent is hereby corrected as shown below:

In column 14, line 4, in Claim 7, after "of" delete "the".

Signed and Sealed this

Fifth Day of October, 2010

David J. Kappos
*Director of the United States Patent and Trademark Office*